United States Patent
Suzuki

(10) Patent No.: US 7,450,775 B2
(45) Date of Patent: Nov. 11, 2008

(54) IMAGE PROCESSING APPARATUS FOR EFFICIENT STORAGE OF VARIABLE BLOCK LENGTH DATA

(75) Inventor: Minoru Suzuki, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 682 days.

(21) Appl. No.: 10/798,374

(22) Filed: Mar. 12, 2004

(65) Prior Publication Data

US 2005/0201630 A1 Sep. 15, 2005

(51) Int. Cl.
*G06K 9/36* (2006.01)
*G06K 9/46* (2006.01)

(52) U.S. Cl. ............... 382/246; 341/67; 358/426.1; 375/240.23

(58) Field of Classification Search ............. 382/245, 382/246
See application file for complete search history.

(56) References Cited

U.S. PATENT DOCUMENTS

| | | | | |
|---|---|---|---|---|
| 5,079,548 A | * | 1/1992 | Fujiyama et al. | 341/67 |
| 5,265,204 A | * | 11/1993 | Kimura et al. | 345/561 |
| 5,329,616 A | * | 7/1994 | Silverbrook | 345/555 |
| 5,497,153 A | * | 3/1996 | Jeong | 341/67 |
| 5,602,549 A | * | 2/1997 | Jeong | 341/67 |
| 5,654,706 A | * | 8/1997 | Jeong | 341/67 |
| 5,825,934 A | * | 10/1998 | Ohsawa | 382/246 |
| 6,064,696 A | * | 5/2000 | Kato et al. | 375/240.03 |
| 6,157,743 A | * | 12/2000 | Goris et al. | 382/233 |
| 6,298,404 B1 | * | 10/2001 | Mishra | 710/100 |
| 6,396,958 B1 | * | 5/2002 | Wilson | 382/246 |
| 6,460,097 B1 | * | 10/2002 | Harumoto et al. | 710/60 |
| 6,683,980 B1 | * | 1/2004 | Meier et al. | 382/166 |

FOREIGN PATENT DOCUMENTS

| | | |
|---|---|---|
| JP | 3-248679 A | 11/1991 |
| JP | 5-56281 A | 3/1993 |
| JP | 5-103213 A | 4/1993 |

* cited by examiner

*Primary Examiner*—Jared W Radkiewicz
*Assistant Examiner*—Sath V. Perungavoor
(74) *Attorney, Agent, or Firm*—Foley & Lardner LLP

(57) ABSTRACT

An image processing apparatus performs variable-length compression on the image data of each block included in one page, and adds a bit to the resultant code data of each block to make it have a constant data length. The apparatus stores the data length of the added bit. On the other hand, the apparatus stores a variable-length code from which the added bit is erased in a storage. If it is determined that respective bits are added to all blocks to make them have the constant data length, the apparatus adds respective bits of different data lengths to variable-length codes read from the storage, thereby converting the data lengths of the blocks into a shorter constant data length than the constant data length.

5 Claims, 3 Drawing Sheets

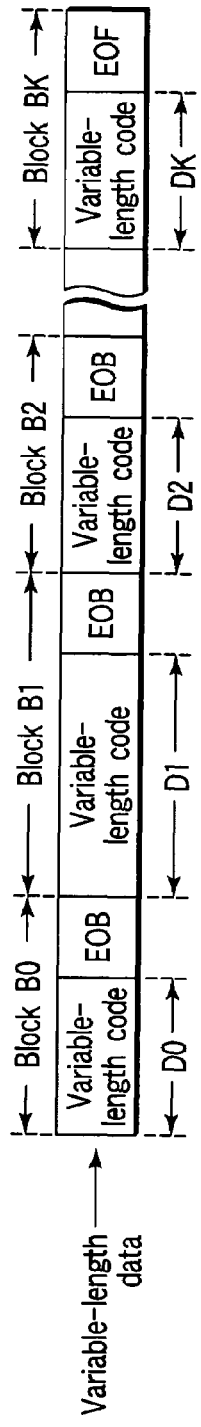
F I G. 3
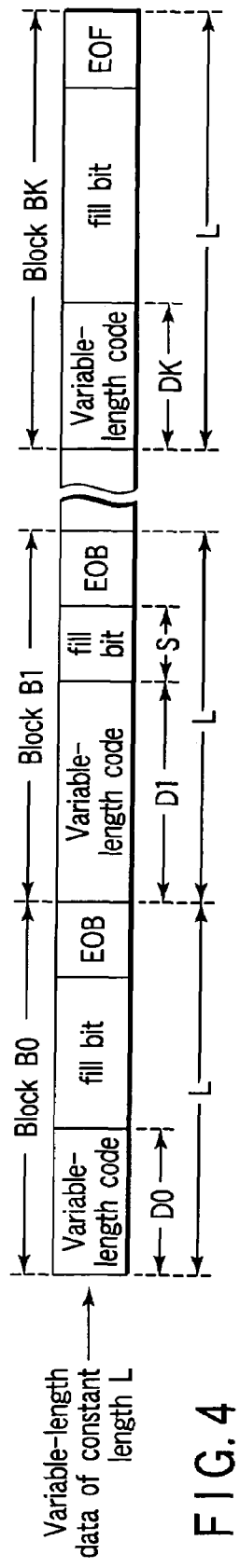
F I G. 4
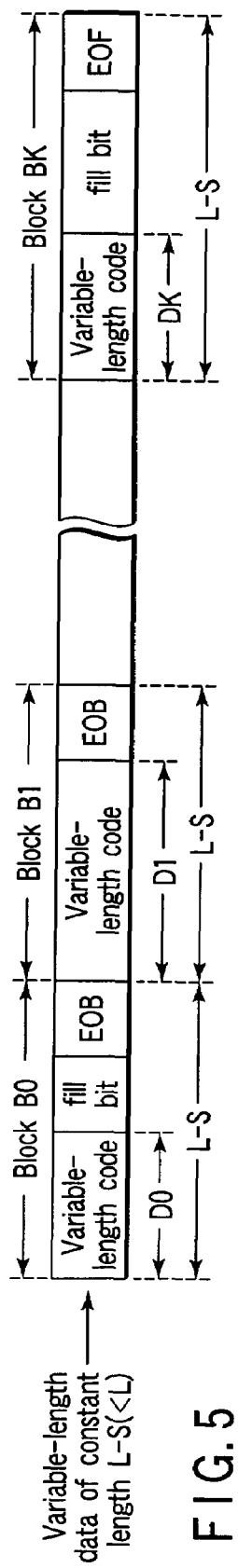
F I G. 5

IMAGE PROCESSING APPARATUS FOR EFFICIENT STORAGE OF VARIABLE BLOCK LENGTH DATA

BACKGROUND OF THE INVENTION

1. Field of the Invention

The present invention relates to an image processing apparatus capable of subjecting image data to variable-length compression.

2. Description of the Related Art

In image processing apparatuses in which image data is subjected to variable-length compression and stored into, for example, a hard disk via a page memory, the system processing section generally performs, for example, a process for adding a fill bit to a code in units of blocks for compression (i.e., in units of [n×n] pixels) to make the data length of each block constant. This is to facilitate data editing in the page memory. Further, since in variable-length compression, the code length in each block varies in accordance with the contents of an image, the data length is often set to the longest one that is expected in one-page image data, to avoid code truncation. Alternatively, it is set to a value that guarantees only a small truncation which has little influence on image quality.

However, in many cases, the actual code length of an image read by a scanner is much shorter than a data length set in light of the longest code length. Accordingly, also when the compressed data stored in the hard disk via the page memory is transferred to the printer again via the page memory, each block will be made to have a constant length near the longest code length. This being so, a greater amount of data than actually needed is processed, thereby overloading the system. This inevitably reduces the processing speed of the entire image processing apparatus.

In light of the above, there is a need for an image processing apparatus capable of adjusting the data length of each block in accordance with an image before making the data length of each block constant, thereby reducing the data amount of each page and hence reducing the load on the system.

BRIEF SUMMARY OF THE INVENTION

According to an aspect of the invention, there is provided an image processing apparatus comprising: a variable-length compression section which performs variable-length compression on image data of each block included in one page; an adjusting section which adjusts each block to a constant data length by adding a bit to or truncating part of a variable-length code of each block obtained by compression by the variable-length compression section; a bit-length storage which stores a data length of the bit added by the adjusting section to the variable-length code of each block; a determination section which determines whether the adjusting section has added respective bits to all blocks included in the one page; a variable-length-code storage which stores variable-length codes obtained by erasing the added bits from the variable-length codes of the all blocks; and a block-data-length conversion section which adds respective bits of different data lengths to variable-length codes of blocks read from the variable-length-code storage, converting data lengths of the blocks into a shorter constant data length than the constant data length, if the determination section determines that the respective bits are added to the all blocks, the different data lengths being obtained by subtracting a shortest data length from a data length of each block stored in the bit-length storage.

Objects and advantages of the invention will become apparent from the description which follows, or may be learned by practices of the invention.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 3 is a view illustrating variable-length code data in each block in the embodiment;

FIG. 4 is a view illustrating data items of a constant length, obtained by adding respective fill bits to the variable-length code data items of blocks; and FIG. 5 is a view illustrating data items that have a constant length shorter than the data items shown in FIG. 4 and that are obtained by adding respective fill bits to the variable-length code data items of the blocks in the embodiment.

DETAILED DESCRIPTION OF THE INVENTION

An embodiment of the invention will be described.

Figure 1:
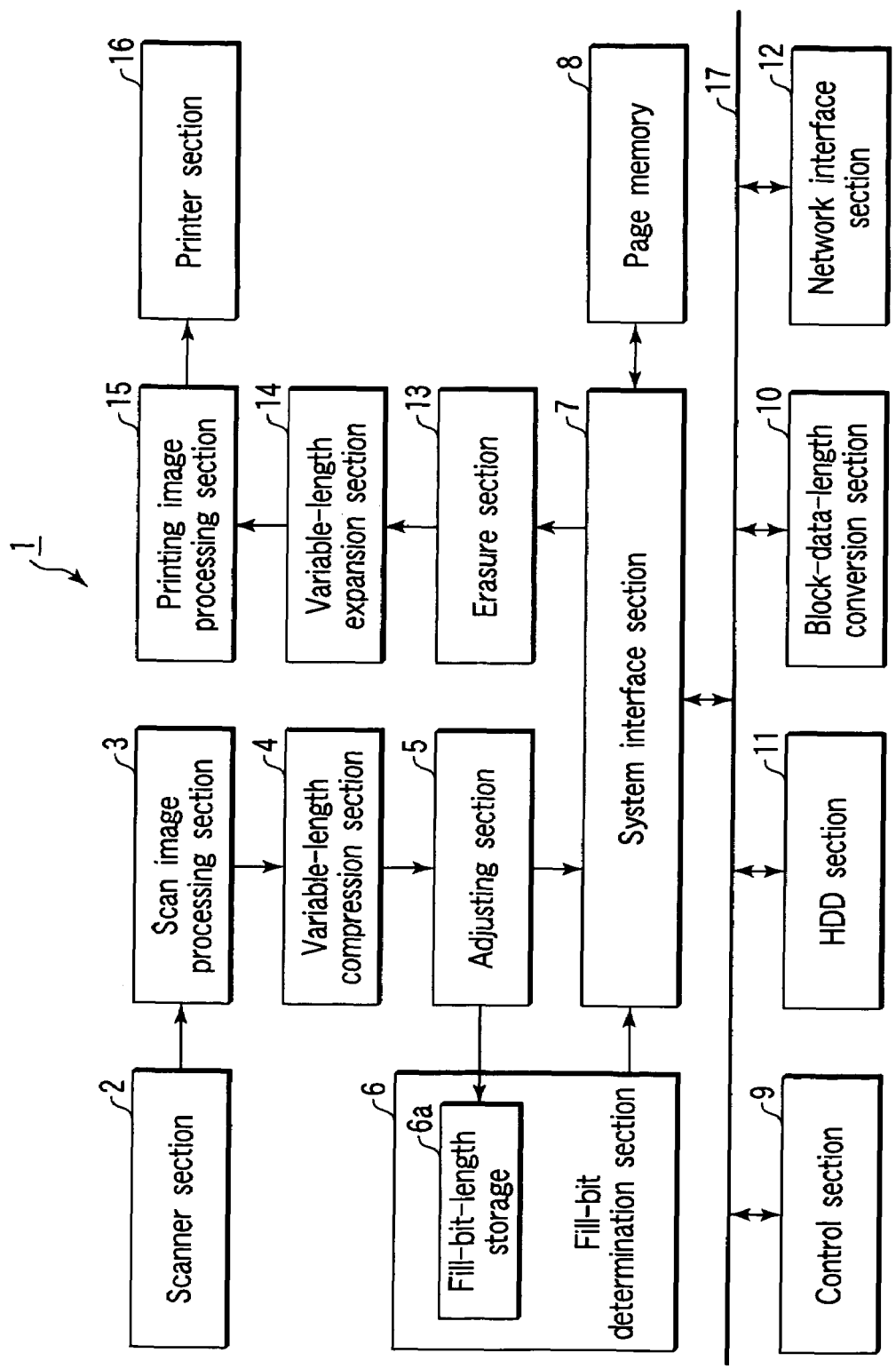
FIG. 1 is a block diagram illustrating an essential part of the control configuration of an image processing apparatus according to an embodiment of the invention.

FIG. 1 schematically shows the internal configuration of an image processing apparatus 1. The image processing apparatus 1 comprises a scanner section 2, scan image processing section 3, variable-length compression section 4, adjusting section 5, a fill-bit determination section 6 having a fill-bit-length storage 6a, system interface section 7, page memory 8 and control section 9. It further comprises a block-data-length conversion section 10, hard disk drive (HDD) section 11, network interface section 12, erasure section 13, variable-length expansion section 14, printing image processing section 15 and printer section 16. Further, the system interface section 7 is connected, via a bus line 17, to the control section 9, block-data-length conversion section 10, HDD section 11 and network interface section 12.

The control section 9 is formed of a CPU, ROM, etc., and used to control each of the above-mentioned sections.

The scanner section 2 has line sensors corresponding to four colors, such as red (R), green (G), blue (B) and black (BK), a fluorescent lamp and an image processing section (these are not shown). Light is applied from the fluorescent lamp to a document placed in a predetermined position or fed from an auto-document feeder (ADF), and the light reflected therefrom is received by the line sensors. An analog signal indicating the received light is amplified and then subjected to various types of correction, such as shading correction and non-linear correction. After that, the signal is supplied as color or monochrome image data to the scan image processing section 3. The scanner section 2 is similar to conventional ones, therefore no detailed description is given thereof.

The scan image processing section 3 is a processor for performing image processing on image data supplied from the scanner section 2. For example, the scan image processing section 3 performs color conversion and filtering on image data if the image data is color image data.

Figure 2:
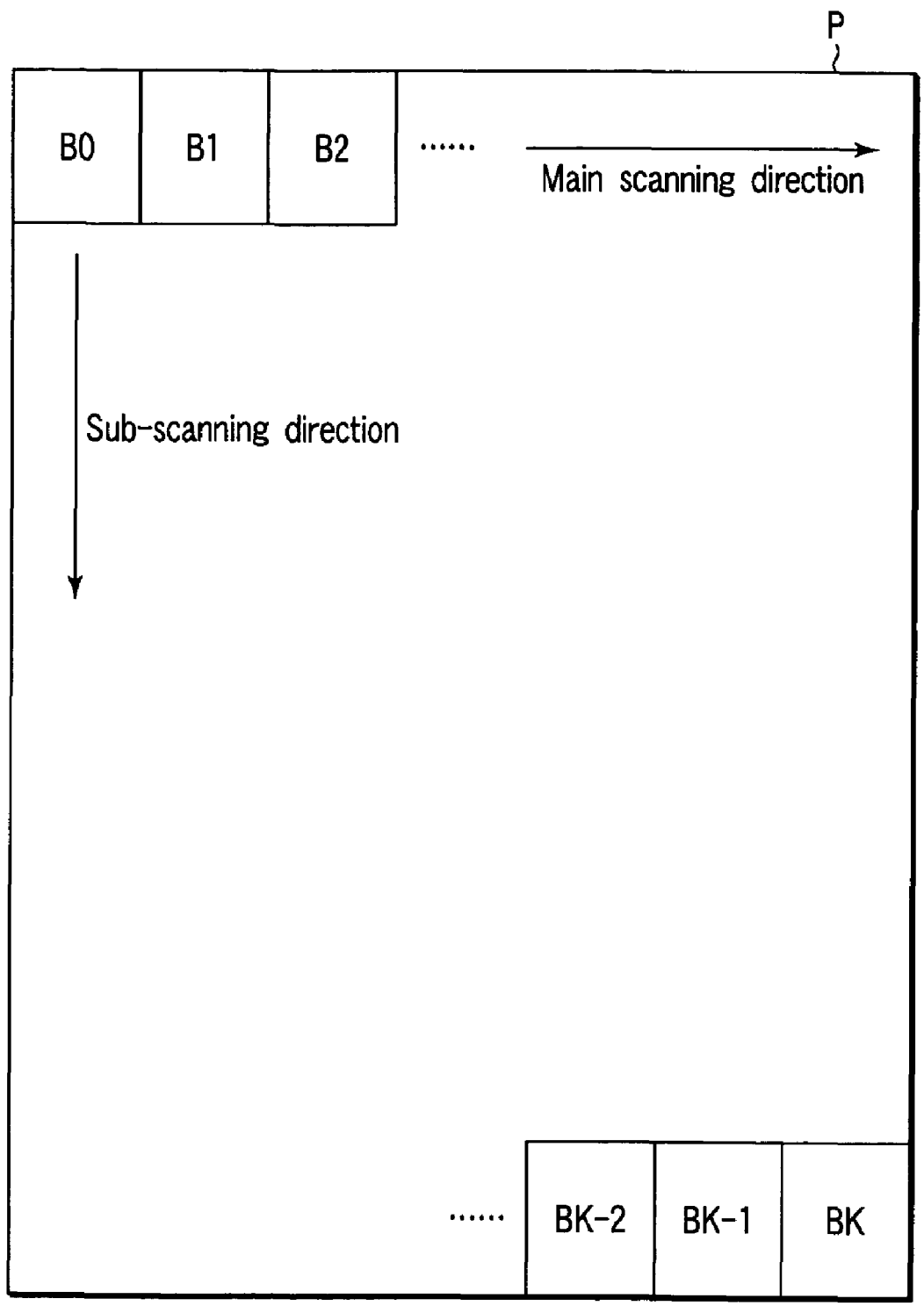
FIG. 2 is a view useful in explaining an image-reading block incorporated in the embodiment.

The variable-length compression section 4 performs compression processing on the image data supplied from the scan image processing section 3 to suppress the data amount. Compression processing is performed in units of blocks. FIG. 2 shows a block subjected to compression processing. As shown, data is compressed in the main scanning direction in units of blocks of a certain size (i.e., blocks of [n×n] pixels). After finishing the main-scanning-directional compression, one block is shifted in the sub-scanning direction, and compression processing is performed again in the main scanning direction. By repeating this operation, one-page compression is performed. Assume that reference numerals B0, B1, ..., BK are attached to the respective blocks in the order of compression. For instance, the variable-length compression section 4 performs joint photographic experts group (JPEG) processing on color image data. The color data image coded by JPEG has different data lengths between different blocks except for the case where the blocks accidentally have the same data length. FIG. 3 shows variable-length code data. As shown, each block B0, B1, ..., BK−1 is formed of a variable-length code and an end-of-block (EOF) indicating the end thereof. Further, the block BK is formed of a variable-length code and an end-of-file (EOF) indicating the end of a page. The length of the variable-length code of each block is represented by data length D0, D1, ... DK.

The adjusting section 5 adds a fill bit to or truncates part of the variable-length code of each block compressed by the variable-length compression section 4, so that the variable-length codes have a predetermined data length L. FIG. 4 shows variable-length code data of the data length L obtained by adding a fill bit to the variable-length code data of each block shown in FIG. 3. As shown, a fill bit is added between the variable-length code and EOB or EOF of each block, so that each block B0, B1, ..., BK will have the data length L. In the example of FIG. 3, since the blocks B0, B1, ..., BK have data lengths shorter than the data length L, respective fill bits are added thereto. Further, the fill bit added to the block B1 has the shortest data length. Assume that this shortest data length is S. The above process makes all the blocks B0, B1, ..., BK have the same data length L.

The fill-bit determination section 6 has the fill-bit-length storage 6a. The fill-bit-length storage 6a stores information concerning the data lengths of the fill bits added to the respective blocks by the adjusting section 5. The fill-bit determination section 6 determines whether respective fill bits are added to all blocks of each page by the adjusting section 5, based on the data lengths stored in units of pages in the fill-bit-length storage 6a.

The system interface section 7 supplies the page memory 8 with the data output from the adjusting section 5, and supplies the block-data-length conversion section 10 with the data output from the page memory 8. The system interface section 7 also supplies the page memory 8 with the data output from the block-data-length conversion section 10, and supplies the erasure section 13 with the data output from the page memory 8. Based on the determination results of the fill-bit determination section 6, the system interface section 7 further supplies the block-data-length conversion section 10 or erasure section 13 with the data length of a fill bit added to each block B0, B1, ..., BK and stored in the fill-bit-length storage 6a.

The page memory 8 temporarily stores, in units of pages, code data supplied via the system interface section 7. In the image processing apparatus 1, there is a case where a user designates, using, for example, a control panel (not shown), to, for example, rotate or reverse the image read by the scanner section 2. In this case, rotation or reverse of an image is performed in units of pages in the page memory 8. As described above, in order to facilitate the process in the page memory 8, the adjusting section 5 adds a fill bit to or truncates part of the variable-length code data to make each block have a constant data length, before the variable-length code data is temporarily stored in the page memory 8.

If variable-length code data of the constant data length L obtained by adding a fill bit to each block B0, B1, ..., BK is supplied from the system interface section 7 to the block-data-length conversion section 10, the section 10 stores the variable-length code data into the HDD section 11 after erasing the fill bit from the variable-length code data, based on the data lengths of each block stored in the fill-bit-length storage 6a. As a result, the amount of data stored in the HDD section 11 is reduced.

Furthermore, the block-data-length conversion section 10 performs the process, for acquiring a constant data length, of again adding a fill bit to each variable-length code data item that is supplied form the HDD section 11 and has a fill bit removed previously. At this time, if the fill-bit determination section 6 determines that respective fill bits are added to all blocks B0, B1, ..., BK of each page, the block-data-length conversion section 10 adds, to the variable-length code data of each block B0, B1, ..., BK read from the HDD section 11, a fill bit of a data length that is obtained by subtracting the shortest data length from the data length of each block B0, B1, ..., BK stored in the fill-bit-length storage 6a, thereby converting each block into a block of a constant data length shorter than the data length L. This process will be described, using, as an example, the variable-length code data explained with reference to FIGS. 3 and 4. The variable-length code data supplied from the HDD section 11 has its fill bit erased and assumes the state shown in FIG. 3. The data length S of the fill bit of the block B1, which is the shortest between the fill bits added to the blocks B0, B1, ..., BK, is subtracted from the data length of the fill bit of each block B0, B1, ..., BK. The resultant data length is added to the variable-length code of each block B0, B1, ..., BK. FIG. 5 illustrates variable-length code data obtained by adding the above-mentioned resultant data length to each variable-length code. The data length (L-S) of each block B0, B1, ..., BK is shorter than the data length L. Further, no fill bit is added to the block B1. Thus, when respective fill bits are added to all blocks B0, B1, ..., BK based on the determination results of the fill-bit determination section 6 in units of pages, if fill bit data length (=S in FIG. 4) corresponding to the shortest data length is erased from the to-be-added fill bits, the codes can be made to have a constant code length (corresponding to (L-S)) using fill bits of the minimum total data size without truncation of the codes. The data items of the blocks B0, B1, ..., BK of each page, having their lengths adjusted to (L-S), are supplied to the page memory 8 via the system interface section 7. Accordingly, in the page memory 8, the code data amount per one page is reduced.

Further, if the fill-bit determination section 6 determines that fill bits are not added to all blocks B0, B1, ..., BK of each page, the block-data-length conversion section 10 adds, to the variable-length code data items of blocks B0, B1, ..., BK read from the HDD section 11, respective fill bits of data lengths corresponding to the data lengths of the blocks B0, B1, ..., BK stored in the fill-bit-length storage 6a, thereby converting each block into a block of the data length L. For example, fill bits of the data lengths corresponding to the data lengths of the blocks B0, B1, ..., BK stored in the fill-bit-length storage 6a are added to the respective variable-length code data items read from the HDD section 11, which assume the state as shown in FIG. 3, thereby converting them into the variable-length code data items as shown in FIG. 4.

The HDD section 11 stores variable-length code data having fill bit data thereof erased by the block data-length conversion section 10. Since thus, the variable-length code data stored in the HDD section 11 has fill bit data thereof erased, the stored data amount is reduced.

The network interface section 12 receives image data from an external device (not shown), and outputs image data to an external device.

The erasure section 13 erases the added fill bits from the code data supplied from the page memory 8 via the system interface section 7, based on the determination result of the fill-bit determination section 6 and the data lengths of the fill bits added to the blocks B0, B1, . . . , BK and stored in the fill-bit-length storage 6a. Thus, the code data is adjusted so that it is restored to the original variable-length code data. More specifically, if the fill-bit determination section 6 determines that respective fill bits are added to all blocks of each page, the following process is performed. Fill bit data of a length obtained by subtracting the shortest data length from the data length of a fill bit added to each block B0, B1, . . . , BK stored in the fill-bit-length storage 6a is erased from each block B0, B1, . . . , BK. On the other hand, if the fill-bit determination section 6 determines that fill bits are not added to all blocks of each page, respective fill bit data items of lengths that correspond to the data lengths of the fill bits added to the blocks B0, B1, . . . , BK stored in the fill-bit-length storage 6a are erased from the blocks B0, B1, . . . , BK.

The variable-length expansion section 14 subjects expansion processing on the variable-length code data supplied from the erasure section 13, and supplies the resultant image data to the printing image processing section 15.

The printing image processing section 15 performs, for example, inking or gradation processing on the image data supplied from the variable-length expansion section 14. The resultant image data is supplied to the printer section 16.

The printer section 16 performs printing based on the image data supplied from the printing image processing section 15. The printer section 16 operates in the same manner as in the prior art, therefore no detailed description is given thereof.

An image data processing example performed by the image processing apparatus 1 constructed as above will now be described. Image data read by the scanner section 2 is subjected to image processing by the scan image processing section 3, and then to variable-length compression, such as JPEG, by the variable-length compression section 4. Subsequently, the resultant image data is supplied to the adjusting section 5, where it is subjected to, for example, the processing of adding a fill bit to a code in units of blocks for compression (each block being formed of [n×n] pixels), thereby adjusting the data length of each block to a predetermined value. The code data having each block B0, B1, . . . , BK adjusted to a predetermined data length is temporarily stored in the page memory 8 via the system interface section 7, then supplied to the block-data-length conversion section 10, where the added fill bits are erased to restore the original variable-length code data, and the restored data is transferred to and stored in the HDD section 11. At this time, the fill-bit-length storage 6a stores the data length of the fill bit added to each block B0, B1, . . . , BK, and the fill-bit determination section 6 stores data as to whether respective fill bits are added to all blocks of each page. The variable-length code data stored in the HDD section 11 is read therefrom if the printer section 16 requests it. The block-data-length conversion section 10 performs, for example, the processing of adding a fill bit to a code in units of blocks, thereby converting the data length of each block into a predetermined value. At this time, if the fill-bit determination section 6 determines that respective fill bits are added to all blocks B0, B1, . . . , BK of each page, the data length of each block B0, B1, . . . , BK is converted into a value shorter than the above-mentioned predetermined data length. On the other hand, if the fill-bit determination section 6 does not determine that respective fill bits are added to all blocks B0, B1, . . . , BK of each page, the data length of each block B0, B1, . . . , BK is converted into the above-mentioned predetermined data length. The resultant data is temporarily stored into the page memory 8 via the system interface section 7. The fill-bit added code data is supplied from the page memory 8 to the erasure section 13, where the added fill bits are erased, and the resultant data is supplied to the variable-length expansion section 14. The image data decoded by the variable-length expansion section 14 is subjected to image processing by the printing image processing section 15, and then transferred to the printer section 16. The printer section 16 performs printing of the data.

Therefore, if the data length of each block included in one page is shorter than a predetermined data length, the block-data-length conversion section 10 performs the following when one-page data is read from the HDD section 11 to the variable-length expansion section 14 via the page memory 8. That is, the block-data-length conversion section 10 adjusts the fill bit, added to each block B0, B1, . . . , BK, to a data length shorter than the predetermined data length, based on the determination result of the fill-bit determination section 6 and the data lengths stored in the fill-bit-length storage 6a. Accordingly, when data is read to the variable-length expansion section 14 for printing, the amount of the code data of each block included in each page can be reduced, which means that the data amount of each page can be reduced. As a result, the load on the image processing apparatus 1 during processing is reduced, which enables an increase in processing speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
    a variable-length compression section which performs variable-length compression on image data of each block included in one page;
    an adjusting section which adjusts each block to a constant data length by adding to or truncating part of a variable-length code of each block obtained by compression by the variable-length compression section;
    a bit-length storage which stores a data length of bits added by the adjusting section to the variable-length code of each block;
    a determination section which determines whether the adjusting section has added respective bits to all blocks included in the one page;
    a variable-length-code storage which stores variable-length codes obtained by erasing the added bits from the variable-length codes of the all blocks;
    a block-data-length conversion section which adds respective bits of different data lengths to variable-length codes of blocks read from the variable-length-code storage, converting data lengths of the blocks into a shorter constant data length than the constant data length, if the determination section determines that the respective bits are added to the all blocks, the different data lengths being obtained by subtracting a shortest data length from a data length of each block stored in the bit-length storage;

a page memory which stores the variable-length code of each block, the variable-length code having the constant data length; and an erasure section which erases the bits added to the variable-length code of each block, when the variable-length code is read from the page memory to an expansion section which performs expansion processing on the image data, wherein the variable-length compression section, the adjusting section, the bit-length storage, the determination section and the variable-length-code storage are operated when the image data is compressed, and the block-data-length conversion section, the page memory and the erasure section are operated when the image data is subjected to the expansion processing by the expansion section.

2. The image processing apparatus according to claim 1, wherein if the determination section determines that the respective bits are not added to the all blocks, the block-data-length conversion section adds respective bits of data lengths, stored in the bit-length storage, to the variable-length codes of the blocks read from the variable-length-code storage, converting the data length of each block into the constant data length.

3. The image processing apparatus according to claim 1, wherein the variable-length compression section performs joint photographic experts group processing.

4. A method for processing image, comprising:

compressing image data of each block included in one page;

adjusting each block to a constant data length by adding to or truncating part of a variable-length code of each block obtained by compression by the variable-length compression section;

storing in a bit-length storage, a data length of bits added by adjusting each block to the constant data length to the variable-length code of each block;

determining whether adding respective bits to all blocks or not;

storing in a variable-length-code storage, variable-length codes obtained by erasing the added bits from the variable-length codes of the all blocks; and processing respective bits of different data lengths to variable-length codes of blocks read from the variable-length-code storage;

converting data lengths of the blocks into a shorter constant data length than the constant data length, if the determining the respective bits are added to the all blocks, the different data lengths being obtained by subtracting a shortest data length from a data length of each block stored in the bit-length storage;

storing in a page memory, each block the data length of which is converted into the constant data length; and erasing the bits added to the variable-length code of each block, when the variable-length code is read from the page memory to an expansion section, wherein the compressing, the adjusting, the storing the data length of the bits, the determining and the storing the variable-length codes are performed when the image data is compressed, and the converting, the storing each block and the erasing are performed when the image data is subjected to expansion processing by the expansion section.

5. The method according to claim 4, wherein when the image data is subjected to the expansion processing by the expansion section, if the determining the respective bits are not added to the all blocks, the respective bits of data lengths, stored in the bit-length storage, to the variable-length codes of the blocks read from the variable-length-code storage, and converting the data length of each block into the constant data length.

\* \* \* \* \*